(12) United States Patent
Wang et al.

(10) Patent No.: US 12,011,693 B2
(45) Date of Patent: Jun. 18, 2024

(54) ZEOLITE MEMBRANE AND PREPARATION METHOD THEREOF

(71) Applicant: Tongji University, Shanghai (CN)

(72) Inventors: Zhiwei Wang, Shanghai (CN); Wei Shi, Shanghai (CN); Huimin Zhou, Shanghai (CN); Xueye Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 396 days.

(21) Appl. No.: 17/326,365

(22) Filed: May 21, 2021

(65) Prior Publication Data

US 2022/0219126 A1 Jul. 14, 2022

(30) Foreign Application Priority Data

Jan. 13, 2021 (CN) .......................... 202110039872.9

(51) Int. Cl.
*B01D 71/02* (2006.01)
*B01D 67/00* (2006.01)
(Continued)

(52) U.S. Cl.
CPC ....... *B01D 71/028* (2013.01); *B01D 67/0079* (2013.01); *B01D 67/0083* (2013.01);
(Continued)

(58) Field of Classification Search
CPC .............. B01D 71/028; B01D 67/0079; B01D 67/0083; B01D 67/0095; B01D 69/02; B01D 69/10; B01D 69/148; B01D 71/34; B01D 2323/08; B01D 2323/12; B01D 2323/14; B01D 2325/04; B01D 61/025;
(Continued)

(56) References Cited

U.S. PATENT DOCUMENTS

2005/0230305 A1* 10/2005 Kulkarni .............. B01D 69/141
96/10

FOREIGN PATENT DOCUMENTS

CN 108905968 A * 11/2018 ............. B01D 39/06
CN 109621739 A * 4/2019 ......... B01D 67/0011
(Continued)

*Primary Examiner* — Hayden Brewster
(74) *Attorney, Agent, or Firm* — Bayramoglu Law Offices LLC

(57) ABSTRACT

A zeolite membrane and a preparation method thereof are provided. The method includes: adding an organic binder solution dropwise to zeolite, and thoroughly grinding and stirring; blade-coating a resulting mixture on a substrate at a given thickness; and drying to obtain the zeolite membrane. The preparation of a zeolite membrane does not require a complicated hydrothermal crystal growth process, and the membrane can be prepared directly from natural zeolite or artificial zeolite. A prepared zeolite membrane has the characteristics of simple preparation process, low cost, prominent water permeability, high contaminant rejection rate and high zeolite load. The zeolite membrane, when used for the rejection of contaminants in water, can not only remove macromolecular contaminants in water, but also efficiently remove ammonia nitrogen by way of ion exchange, which is suitable for advanced treatment of wastewater.

13 Claims, 2 Drawing Sheets

(51) Int. Cl.
    *B01D 69/02*     (2006.01)
    *B01D 69/10*     (2006.01)
    *B01D 69/14*     (2006.01)
    *B01D 71/34*     (2006.01)
    *C02F 1/44*     (2023.01)
    *C02F 101/16*     (2006.01)
    *C02F 101/38*     (2006.01)

(52) U.S. Cl.
    CPC ......... *B01D 67/0095* (2013.01); *B01D 69/02* (2013.01); *B01D 69/10* (2013.01); *B01D 69/148* (2013.01); *B01D 71/34* (2013.01); *C02F 1/44* (2013.01); *B01D 2323/08* (2013.01); *B01D 2323/12* (2013.01); *B01D 2323/14* (2013.01); *B01D 2325/04* (2013.01); *C02F 2101/16* (2013.01); *C02F 2101/38* (2013.01)

(58) Field of Classification Search
    CPC ........ B01D 71/12; B01D 71/24; B01D 71/32; B01D 71/38; B01D 69/12; C02F 1/44; C02F 2101/16; C02F 2101/38; C02F 1/42; C02F 1/444; C02F 1/441
    See application file for complete search history.

(56) References Cited

FOREIGN PATENT DOCUMENTS

| | | | | |
|---|---|---|---|---|
| CN | 114425245 A | * | 5/2022 | |
| WO | WO-2020166536 A1 | * | 8/2020 | ........... B01D 61/364 |

* cited by examiner

ZEOLITE MEMBRANE AND PREPARATION METHOD THEREOF

CROSS REFERENCE TO THE RELATED APPLICATIONS

This application is based upon and claims priority to Chinese Patent Application No. 202110039872.9, filed on Jan. 13, 2021, the entire contents of which are incorporated herein by reference.

TECHNICAL FIELD

The present invention belongs to the technical field of membrane separation, and specifically relates to a zeolite membrane and a preparation method thereof.

BACKGROUND

As the main component of nitrogen compounds in water, ammonia nitrogen is a key substance that causes water eutrophication. Therefore, it is extremely important to remove ammonia nitrogen in wastewater. Current methods for removing ammonia nitrogen include a biological method, a chemical method, and a reverse osmosis (RO) membrane method. However, the biological method is susceptible to the fluctuation of water quality and the external environment, with long treatment cycles and complex operations, which can hardly be used to treat ammonia nitrogen wastewater with a low organic matter content. The chemical method requires chemical reagents to remove ammonia nitrogen, which is costly and easily produces harmful by-products. The RO membrane method has the disadvantages of high operation cost, low treatment capacity, and poor ammonia nitrogen removal efficiency. For this reason, pursuing an efficient and low-cost method for removing ammonia nitrogen in water is an area of current focus and research.

The ion exchange method has been used to treat $NH_4^+$ in many kinds of wastewater, but using an organic resin as an exchanger requires a very high cost and a complicated regeneration process. It is also prone to secondary pollution. The method of using zeolite as an ion exchanger to remove ammonia nitrogen is considered to be an effective treatment method due to its low cost and relatively-simple use and operation. However, zeolite can only treat $NH_4^+$ and other ionic contaminants in water, and when zeolite is directly used as an ion exchanger, there are problems such as time-consuming separation of zeolite from water and difficulty in zeolite regeneration. Preparing zeolite into a membrane is an effective way to solve the above problems. Therefore, it is very necessary to develop a zeolite membrane that can treat wastewater containing ammonia nitrogen at a low cost.

SUMMARY

The present invention is intended to provide a low-cost and easily-prepared zeolite membrane for water treatment and a preparation method thereof. The zeolite membrane can not only efficiently reject macromolecular contaminants, but also achieve the removal of $NH_4^+$ and other ionic contaminants.

The present invention provides the following technical solutions: a method for preparing a zeolite membrane, including the following steps:

1) adding an organic binder solution dropwise to zeolite, and thoroughly grinding and stirring;

2) blade-coating a mixture obtained in step 1) on a substrate to obtain a substrate with a zeolite membrane matrix; and 3) drying the substrate obtained in step 2) at 40° C. in air for 12 h to obtain the zeolite membrane.

Further, the zeolite used in step 1) may be one or more of natural zeolite and artificial zeolite and may have a particle size less than 100 μm.

Further, a solute in the organic binder solution may be one or more of polyvinylidene fluoride (PVDF), polytetrafluoroethylene (PTFE), polyvinyl alcohol (PVA), styrene-butadiene rubber (SBR), and carboxymethyl cellulose (CMC).

Further, a solvent in the organic binder solution may be one or more of N-methyl pyrrolidone (NMP), N,N-dimethylacetamide (DMAC), N,N-dimethylformamide (DMF), triethyl phosphate (TEP), and dimethyl sulfoxide (DMSO).

Further, an organic binder may have a mass concentration of 0.1% to 30% in the organic binder solution.

Further, the organic binder solution and the zeolite in the step 1) may have a mass ratio of 0.1:1 to 6:1.

Further, the substrate used in step 2) may be one or more of a non-woven fabric, a metal mesh with a pore size less than 0.1 mm, a microfiltration membrane (MF) and an ultrafiltration (UF) membrane. The MF membrane and UF membrane may be a polyacrylonitrile (PAN) membrane, a polyvinyl chloride (PVC) membrane, a polyethersulfone (PES) membrane, a polypropylene (PP) membrane, a polysulfone (PSF) membrane, a polytetrafluoroethylene (PTFE) membrane, a polyvinylidene fluoride (PVDF) membrane, and so on.

The present invention also provides a zeolite membrane prepared by the method described above, and the zeolite membrane has a thickness of 0.1 mm to 1.5 mm.

Further, filtration using the zeolite membrane may require an operating pressure of 0 kPa to 150 kPa, and the zeolite membrane may have a water flux of 20 $L \cdot m^{-2} \cdot h^{-1}$ to 4,000 $L \cdot m^{-2} \cdot h^{-1}$.

The present invention has the following advantages.

1. In the present invention, natural zeolite or artificial zeolite is prepared into a zeolite membrane with a small amount of organic binder. The preparation method is simple and low in cost, and can be used for mass production.

2. The zeolite membrane prepared in the present invention has a high zeolite load, shows extremely-high water permeability and prominent flexibility, and can realize the treatment of ammonia nitrogen wastewater under gravity flow conditions.

3. The zeolite membrane prepared in the present invention, when used in the treatment of ammonia nitrogen wastewater, can not only remove macromolecular contaminants in water, but also efficiently remove $NH_4^+$ and other ionic contaminants by way of the ion exchange characteristics of zeolite.

4. In the present invention, the preparation of a zeolite membrane does not require a complicated hydrothermal crystal growth process, and the membrane can be prepared directly from natural zeolite or artificial zeolite. A prepared zeolite membrane has the characteristics of simple preparation process, low cost, prominent water permeability, high contaminant rejection rate, high zeolite load, and the like. The zeolite membrane, when used for the removal of contaminants in water, can not only remove macromolecular contaminants in water, but also efficiently remove ammonia nitrogen by way of the ion exchange characteristics of zeolite, which is suitable for advanced treatment of wastewater.

BRIEF DESCRIPTION OF THE DRAWINGS

The present invention will be described in more detail below with reference to the examples and the drawings. Particularly.

DETAILED DESCRIPTION OF THE EMBODIMENTS

The technical solutions in the present invention are clearly and completely described below with reference to the examples of the present invention. Apparently, the described examples are merely some rather than all of the examples of the present invention. All other examples obtained by a person of ordinary skill in the art based on the examples of the present invention without creative efforts shall fall within the protection scope of the present invention.

EXAMPLE 1

Figure 1A:
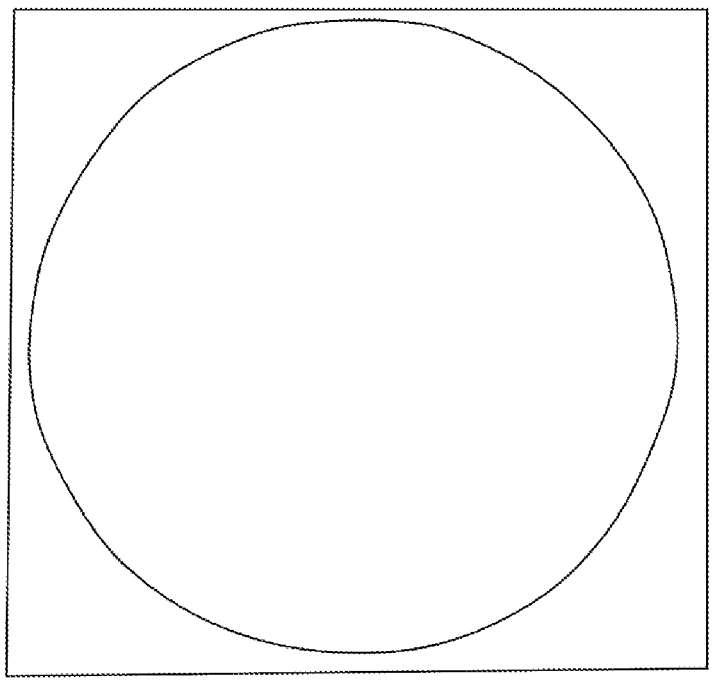
FIG. 1A shows an image of the real zeolite membrane prepared in Example 1 of the present invention.
Figure 1B:
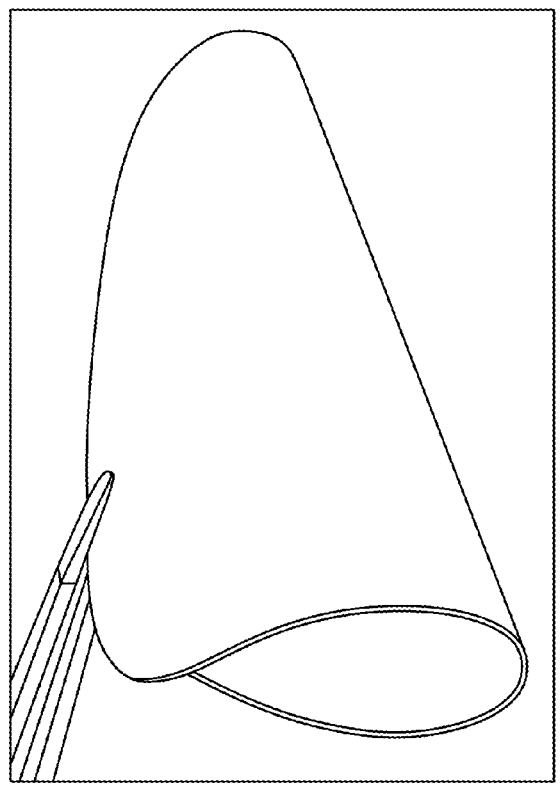
FIG. 1B shows an image of the real zeolite membrane prepared in Example 1 of the present invention from another view.

This example provided a method for preparing a zeolite membrane, specifically as follows:

10 g of a solution of PVDF in NMP with a mass concentration of 6% is added dropwise to 10 g of natural clinoptilolite; a resulting mixture is thoroughly ground and stirred, and then blade-coated on a non-woven fabric at a thickness of 0.5 μm; and then the non-woven fabric is dried to obtain the zeolite membrane. Images of the real zeolite membrane prepared are shown in FIGS. 1A-B.

EXAMPLE 2

This example provided a method for preparing a zeolite membrane, specifically as follows:

10 g of a solution of PVDF in NMP with a mass concentration of 8% is added dropwise to 10 g of natural clinoptilolite; a resulting mixture is thoroughly ground and stirred, and then blade-coated on a non-woven fabric at a thickness of 0.7 μm; and then the non-woven fabric is dried to obtain the zeolite membrane.

EXAMPLE 3

This example provided a method for preparing a zeolite membrane, specifically as follows:

15 g of a solution of PVDF in NMP with a mass concentration of 10% is added dropwise to 10 g of artificial zeolite; a resulting mixture is thoroughly ground and stirred, and then blade-coated on a non-woven fabric at a thickness of 0.9 μm; and then the non-woven fabric is dried to obtain the zeolite membrane.

EXAMPLE 4

This example provided a method for preparing a zeolite membrane, specifically as follows:

10 g of a solution of PVDF in NMP with a mass concentration of 8% is added dropwise to 10 g of artificial zeolite; a resulting mixture is thoroughly ground and stirred, and then blade-coated on a stainless metal mesh with a pore size of 0.025 mm at a thickness of 0.7 μm; and then the stainless metal mesh is dried to obtain the zeolite membrane.

EXAMPLE 5

This example provided a method for preparing a zeolite membrane, specifically as follows:

10 g of a solution of PVDF in DMF with a mass concentration of 6% is added dropwise to 10 g of natural zeolite; a resulting mixture is thoroughly ground and stirred, and then blade-coated on a stainless metal mesh with a pore size of 0.05 mm at a thickness of 0.5 μm; and then the stainless metal mesh is dried to obtain the zeolite membrane.

EXAMPLE 6

This example provided a method for preparing a zeolite membrane, specifically as follows:

10 g of a solution of PVDF in NMP with a mass concentration of 4% is added dropwise to 10 g of natural zeolite; a resulting mixture is thoroughly ground and stirred, and then blade-coated on a PVDF UF membrane at a thickness of 0.3 μm; and then the PVDF UF membrane is dried to obtain the zeolite membrane.

EXAMPLE 7

Figure 2:
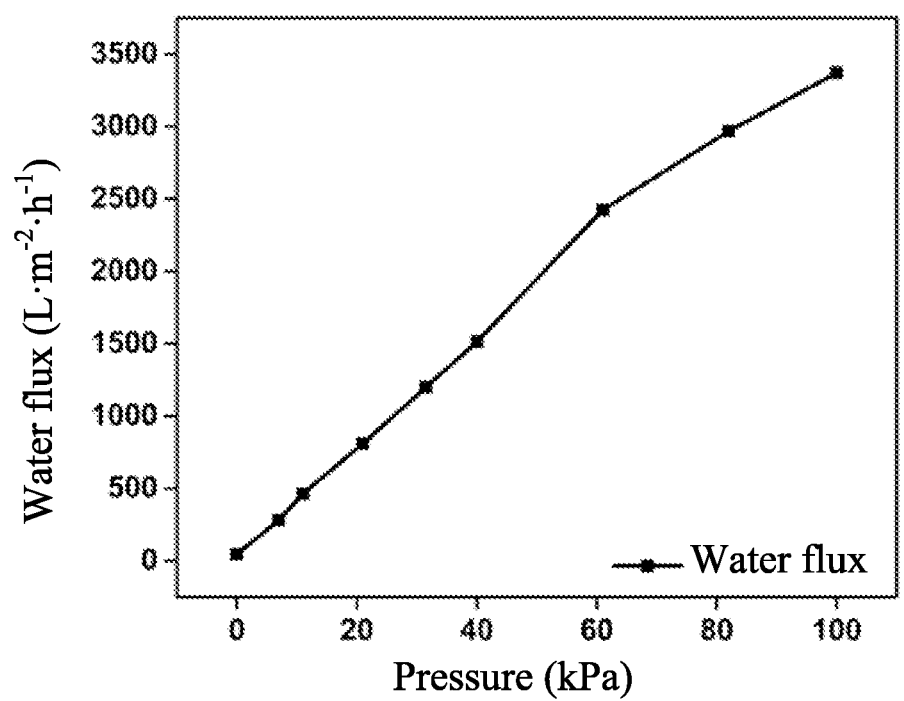
FIG. 2 is a diagram showing a relationship between water flux of the zeolite membrane prepared in Example 1 of the present invention and pressure.

The water flux of the zeolite membrane prepared in Example 1 is tested at an operating pressure of 0 kPa to 100 kPa and a height of 0.1 m that a liquid level is above the zeolite membrane, and results are shown in FIG. 2. The zeolite membrane has a water flux up to 47 $L·m^{-2}·h^{-1}$, and even up to 3,370 $L·m^{-2}·h^{-1}$ at an operating pressure of 100 kPa, indicating that this zeolite membrane has excellent water permeability.

EXAMPLE 8

The contaminant rejection performance of the zeolite membrane prepared in Example 1 is tested at a height of 0.1 m that a liquid level is above the zeolite membrane, and bovine serum albumin (BSA) has a concentration of 0.1 $g·L^{-1}$ in inlet water. Results shows that the zeolite membrane has a BSA rejection rate of 22%.

EXAMPLE 9

The $NH_4^+$ rejection performance of the zeolite membrane prepared in Example 1 is tested at a height of 0.1 m that a liquid level is above the zeolite membrane, and $NH_4^+$ has a concentration of 10 $mg·L^{-1}$ in inlet water. Results shows that the zeolite membrane has a $NH_4^+$ rejection rate of 65%.

The above examples are merely intended to describe the technical solutions of the present invention, rather than to limit the present invention. Although the present invention is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present invention.

In addition, those skilled in the art can understand that, although some examples herein include some features included in other examples but no other features, a combination of features of different examples falls within the scope of the present invention and forms a different example. For example, in the claims, any one of the claimed examples can be used in any combination. The information disclosed in this background section is only intended to deepen the understanding of the general background of the present invention, and should not be regarded as an acknowledgement or any form of suggestion that this information constitutes the prior art commonly known to those skilled in the art.

What is claimed is:

1. A method for preparing a zeolite membrane, comprising the following steps:
   1) adding an organic binder solution dropwise to a zeolite to obtain a mixture, and thoroughly grinding and stirring the mixture;
   2) blade-coating the mixture obtained in step 1) on a substrate to obtain a substrate coated with a zeolite membrane matrix, wherein the substrate is at least one selected from the group consisting of a metal mesh with a pore size less than 0.1 mm, a microfiltration (MF) membrane and an ultrafiltration (UF) membrane, wherein the MF membrane or the UF membrane comprises a polyvinyl chloride (PVC) membrane, a polyethersulfone (PES) membrane, a polypropylene (PP) membrane, a polysulfone (PSF) membrane, a polytetrafluoroethylene (PTFE) membrane, or a polyvinylidene fluoride (PVDF) membrane; and
   3) drying the substrate coated with the zeolite membrane matrix obtained in step 2) at 40° C. in air for 12 h to obtain the zeolite membrane.

2. The method for preparing the zeolite membrane according to claim 1, wherein the zeolite used in step 1) is at least one selected from the group consisting of a natural zeolite and an artificial zeolite, and the zeolite has a particle size less than 100 μm.

3. The method for preparing the zeolite membrane according to claim 1, wherein a solute in the organic binder solution is at least one selected from the group consisting of polyvinylidene fluoride (PVDF), polytetrafluoroethylene (PTFE), polyvinyl alcohol (PVA), styrene-butadiene rubber (SBR), and carboxymethyl cellulose (CMC).

4. The method for preparing the zeolite membrane according to claim 1, wherein a solvent in the organic binder solution is at least one selected from the group consisting of N-methyl pyrrolidone (NMP), N,N-dimethylacetamide (DMAC), N,N-dimethylformamide (DMF), triethyl phosphate (TEP), and dimethyl sulfoxide (DMSO).

5. The method for preparing the zeolite membrane according to claim 1, wherein an organic binder has a mass concentration of 0.1% to 30% in the organic binder solution.

6. The method for preparing the zeolite membrane according to claim 1, wherein the organic binder solution and the zeolite in step 1) have a mass ratio of 0.1:1 to 6:1.

7. A zeolite membrane prepared by the method according to claim 1, wherein the zeolite membrane has a thickness of 0.1 mm to 1.5 mm.

8. The zeolite membrane according to claim 7, wherein a filtration using the zeolite membrane requires an operating pressure of 0 kPa to 150 kPa, and the zeolite membrane has a water flux of 20 $L \cdot m^{-2} \cdot h^{-1}$ to 4,000 $L \cdot m^{-2} \cdot h^{-1}$.

9. The zeolite membrane according to claim 7, wherein the zeolite used in step 1) is at least one selected from the group consisting of a natural zeolite and an artificial zeolite, and the zeolite has a particle size less than 100 μm.

10. The zeolite membrane according to claim 7, wherein a solute in the organic binder solution is at least one selected from the group consisting of polyvinylidene fluoride (PVDF), polytetrafluoroethylene (PTFE), polyvinyl alcohol (PVA), styrene-butadiene rubber (SBR), and carboxymethyl cellulose (CMC).

11. The zeolite membrane according to claim 7, wherein a solvent in the organic binder solution is at least one selected from the group consisting of N-methyl pyrrolidone (NMP), N,N-dimethylacetamide (DMAC), N,N-dimethylformamide (DMF), triethyl phosphate (TEP), and dimethyl sulfoxide (DMSO).

12. The zeolite membrane according to claim 7, wherein an organic binder has a mass concentration of 0.1% to 30% in the organic binder solution.

13. The zeolite membrane according to claim 7, wherein the organic binder solution and the zeolite in step 1) have a mass ratio of 0.1:1 to 6:1.

* * * * *